No. 851,797. PATENTED APR. 30, 1907.
T. L. CARBONE.
CLUTCH MECHANISM.
APPLICATION FILED NOV. 25, 1906.

3 SHEETS—SHEET 1.

WITNESSES
Inventor
Tito Livio Carbone
By Richards
Attorneys

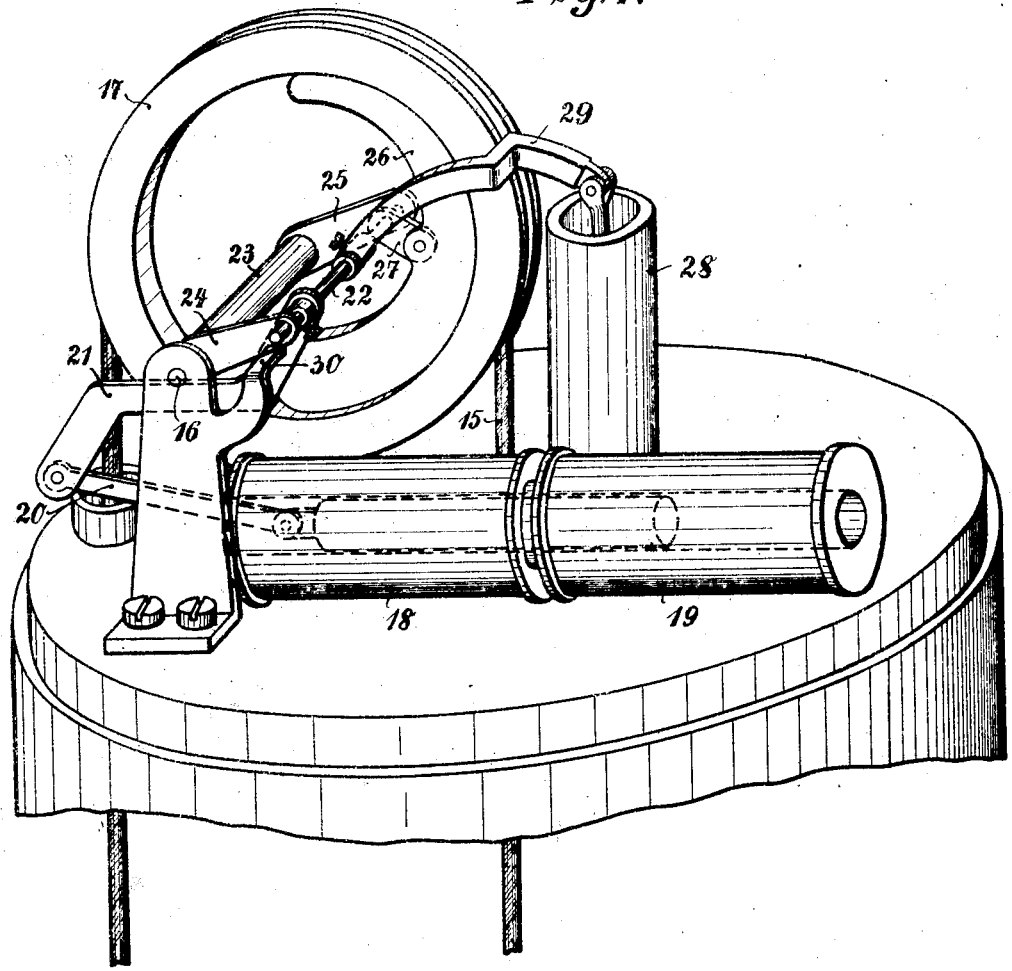

No. 851,797. PATENTED APR. 30, 1907.
T. L. CARBONE.
CLUTCH MECHANISM.
APPLICATION FILED NOV. 25, 1905.

3 SHEETS—SHEET 3.

UNITED STATES PATENT OFFICE.

TITO LIVIO CARBONE, OF BERLIN, GERMANY.

CLUTCH MECHANISM.

No. 851,797.     Specification of Letters Patent.     Patented April 30, 1907.

Original application filed May 16, 1905, Serial No. 260,658. Divided and this application filed November 25, 1905. Serial No. 289,090.

*To all whom it may concern:*

Be it known that I, TITO LIVIO CARBONE, engineer, a citizen of Switzerland, residing at Berlin, Germany, have invented new and useful Improvements in Clutch Mechanisms, of which the following is a specification.

My invention relates to arc lamps the electrode holder of which is suspended by a flexible member such as a chain, a rope or the like passing over a brake wheel, and consists more especially in a regulating mechanism for arc lamps of this kind. The action of the regulating mechanism is an extremely powerful one. It possesses moreover a great sensitiveness, inasmuch as a very small amount of power suffices to bring the brake into and out of engagement with the brake wheel.

Figure 1:
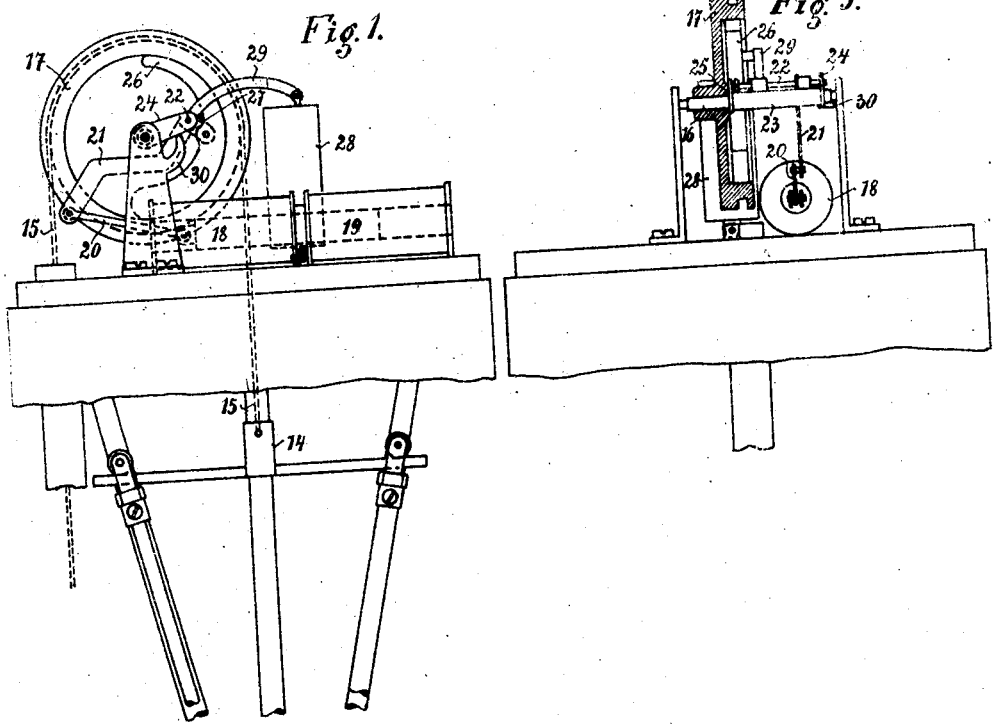
Figure 3:
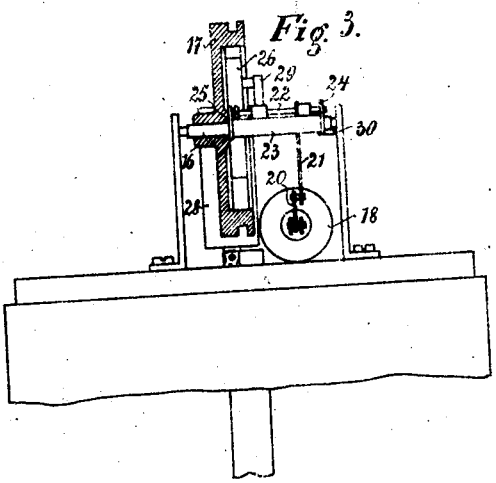
Figure 2:
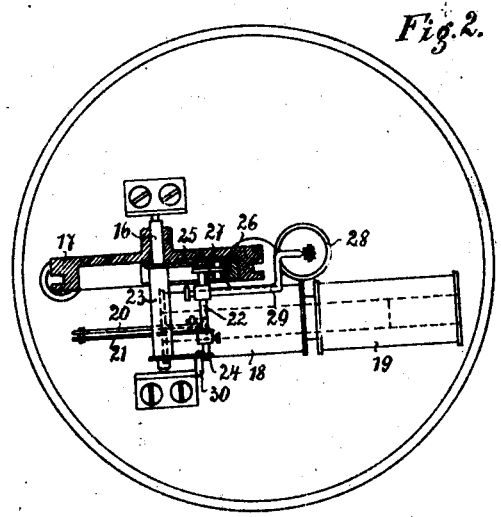
Figure 5:
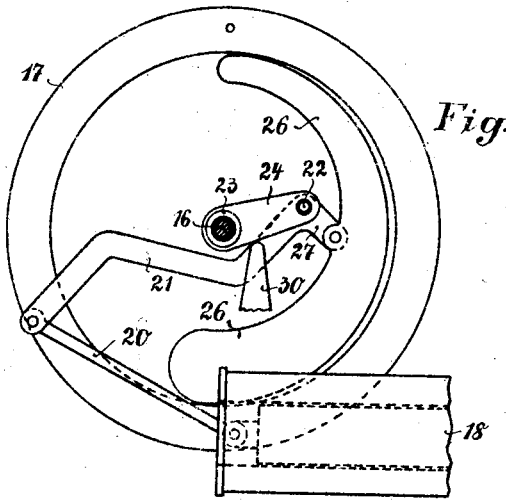
Figure 6:
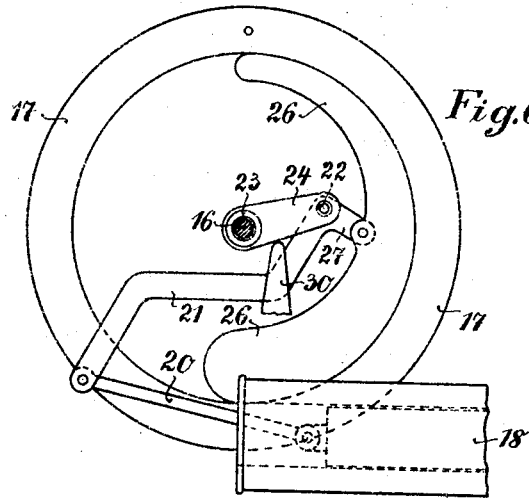
Figure 7:
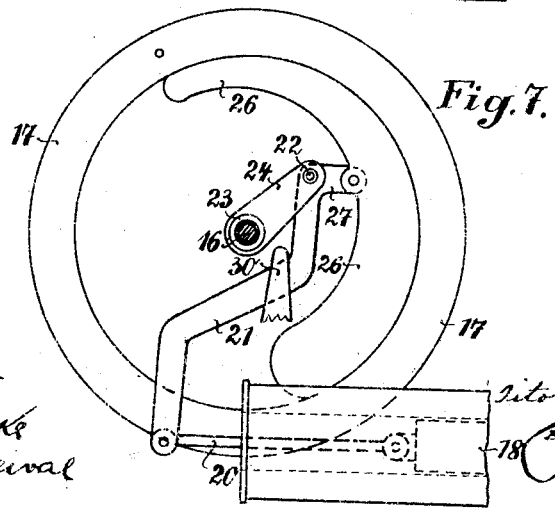

In order to make me better understood I have shown one particular construction of my new arc lamp in the accompanying drawings, in which Figure 1 is a side view of the regulating mechanism; Fig. 2 is a plan view thereof, showing some details in section; Fig. 3 is a side elevation with the chain wheel in section; Fig. 4 is a perspective view of the regulating mechanism; Figs. 5, 6, 7 show different positions of the regulating mechanism.

The electrode holder 14 is suspended by a chain 15 which passes over the wheel 17 revolving loosely upon the axle 16. Both ends of the latter are fixed in suitable standards or the like. A tube 23 is also loosely mounted on the fixed axle 16 and has its both ends provided with arms 24, 25 which form the bearings for an axle 22. In its lowest position the rigid system formed by the tube 23 and its arms 24, 25 rests on a stop 30 projecting from one of the standards in which the axle 16 is fixed. The axle 22 has three arms 21, 27 and 29 rigidly connected with it for instance by screws. The arm 21 is connected by means of a rod 20 with a movable iron core of the electromagnets 18, 19. On the arm 27 a brake pad 26 is arranged which coöperates with the inner surfaces of the rim of the wheel 17. The arm 29 is connected with the piston rod of a dash pot 28 or of a similar device which retards the motions of the regulating mechanism.

The operation of the lamp is as follows. If no current flows through the electrodes and the coils 18, 19 the different parts have the position shown in Fig. 5, the arm 24 resting upon the stop 30 and the pad 26 being only loosely in engagement with the rim of the wheel 17. Upon a current flowing the iron core of the coils 18, 19 is drawn in and turns, by means of the rod 20, the rigid system 21, 22, 27, 29 anti-clockwise, whereby the brake pad 26 is firmly pressed against the rim of the wheel 17 (Fig. 6). As however up to this moment the electrode holder 14 is not yet lifted, the current further increases, so that the iron core of the coils 18, 19 move still more to the right. The brake pad 26 being pressed against the rim of the wheel 17 the latter is now also turned anti-clockwise, as will be seen from the point marked at the upper part of the wheel 17, and all the parts 23, 24, 25, 22, 27, 26, 21 and 29 rotate a certain angle round the rigid axle 16. Thus the electrode holder 14 is lifted by the chain 15 and the tips of the electrodes, which were formerly in contact, are separated from another to a certain distance, whereby the arc is struck. In consequence of the gradual consumption of the electrodes the attraction of the coils 18, 19 diminishes, so that the wheel 14 gradually revolves back, until the arm 24 comes to rest upon the stop 30. As the wheel 17, however, continues to revolve back, the brake pad 26 comes out of engagement with the rim of the wheel 17. Thereupon the electrode holder 14 is allowed to lower, whereby the tips of the electrodes are approached toward one another, so that the described operation of the regulating mechanism may begin anew.

It is, of course, to be understood that I do not limit myself to the particular form of the lamp shown and described. For instance, the lamp may have electrodes arranged in a straight line, one above the other. Further the electromagnetic device may be provided with only one coil etc.

I claim:

1. In an electric arc lamp the combination with a revoluble wheel, a flexible member connected to said wheel an electrode holder suspended by said member, arms rotatably carried by the axle of said wheel, a revoluble axle mounted in said arms, a stationary stop coöperating with said arms, a brake pad connected to said revoluble axle and coöperating with the rim of the wheel, an electro-magnetic device having a core, an arm fixed to the revoluble axle and connecting said core with the revoluble axle.

2. In an arc lamp the combination with a revoluble wheel, a flexible member connected to said wheel, an electrode holder suspended by said member, arms rotatably carried by the axle of said wheel, a revoluble axle carried by said arms, three arms fixed on said revoluble axle, a brake pad carried by one of said arms and coöperating with the rim of the wheel, a dash pot having its movable part connected to another of said arms, an electro-magnetic device having its core connected to the third arm and a stationary stop coöperating with one of the arms carrying the revoluble axle.

In testimony whereof I have signed my name to this specification in the presence of two subscribing witnesses.

TITO LIVIO CARBONE.

Witnesses:
 HENRY HASPER,
 WOLDEMAR HAUPT.